US012647449B2

(12) United States Patent
Toohey et al.

(10) Patent No.: US 12,647,449 B2
(45) Date of Patent: Jun. 2, 2026

(54) SYSTEMS AND METHODS FOR ESTIMATING A CRYPTO-AGILITY SCORE OF A NETWORK OF COMPUTING ASSETS

(71) Applicant: Wells Fargo Bank, N.A., San Francisco, CA (US)

(72) Inventors: Richard Toohey, Burlington, VT (US); Peter Bordow, Fountain Hills, AZ (US); Chao Chen, New York, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 127 days.

(21) Appl. No.: 18/630,797

(22) Filed: Apr. 9, 2024

(65) Prior Publication Data

US 2025/0317465 A1 Oct. 9, 2025

(51) Int. Cl.
*H04L 9/40* (2022.01)
*H04L 41/0869* (2022.01)
*H04L 41/14* (2022.01)
(52) U.S. Cl.
CPC ...... *H04L 63/1433* (2013.01); *H04L 41/0869* (2013.01); *H04L 41/145* (2013.01)
(58) Field of Classification Search
CPC ..................... H04L 63/1433; H04L 41/0869; H04L 41/145
See application file for complete search history.

(56) References Cited

U.S. PATENT DOCUMENTS 10,178,120 B1 1/2019 Keegan
11,265,159 B1 * 3/2022 Truskovsky .............. G06F 8/65
(Continued)

FOREIGN PATENT DOCUMENTS

CN 110113314 A 8/2019
CN 111177417 A 5/2020
(Continued)

OTHER PUBLICATIONS

Hohm et al., "Towards a maturity model for crypto-agility assessment," retrieved from https://arxiv.org/pdf/2202.07645; Feb. 17, 2022.
(Continued)

*Primary Examiner* — Richard G Keehn
(74) *Attorney, Agent, or Firm* — K&L Gates LLP

(57) ABSTRACT

Systems, apparatuses, methods, and computer program products are disclosed for estimating a crypto-agility score of a network of computing assets. An example method includes receiving a network graph and a set of expert-determined importance weights and selecting a first network node from a set of network nodes. The example method further includes computing an upgrade cost for the first network node based on a set of dependency network nodes and applying an expert-determined importance weight to the upgrade cost for the first network node to determine a weighted upgrade cost for the first network node. The example method further includes adding the weighted upgrade cost for the first network node to a set of weighted upgrade costs and summing, by the graph circuitry, each weighted upgrade cost from the set of weighted full upgrade costs to determine the crypto-agility score for the network of computer assets.

20 Claims, 7 Drawing Sheets

(56) References Cited

U.S. PATENT DOCUMENTS

| | | | |
|---|---|---|---|
| 2015/0100671 A1* | 4/2015 | Song | H04L 41/082 |
| | | | 709/221 |
| 2017/0032130 A1 | 2/2017 | Joseph Durairaj | |
| 2017/0180408 A1* | 6/2017 | Yu | H04L 63/1433 |
| 2018/0048669 A1 | 2/2018 | Lokamathe | |
| 2018/0159876 A1 | 6/2018 | Park | |
| 2018/0278642 A1 | 9/2018 | Joy | |
| 2020/0175173 A1 | 6/2020 | Krishnamoorthy | |
| 2020/0267074 A1 | 8/2020 | Wang | |
| 2020/0280577 A1 | 9/2020 | Segal | |
| 2020/0326924 A1* | 10/2020 | A | H04L 41/0893 |
| 2021/0014250 A1 | 1/2021 | Walsh | |
| 2021/0019674 A1 | 1/2021 | Crabtree | |
| 2021/0149658 A1* | 5/2021 | Cannon | G06F 16/9535 |
| 2021/0234889 A1 | 7/2021 | Burle | |
| 2022/0084049 A1 | 3/2022 | Soramaki | |
| 2022/0210200 A1* | 6/2022 | Crabtree | H04L 63/1441 |
| 2022/0224723 A1* | 7/2022 | Crabtree | H04L 63/1433 |
| 2022/0366332 A1* | 11/2022 | Duessel | G06Q 10/0635 |
| 2023/0132703 A1 | 5/2023 | Marsenic | |
| 2023/0289444 A1 | 9/2023 | Ermey | |
| 2024/0273227 A1* | 8/2024 | Thompson | G06F 21/6218 |
| 2025/0103720 A1* | 3/2025 | Bordow | G06F 21/577 |

FOREIGN PATENT DOCUMENTS

| | | |
|---|---|---|
| CN | 117675413 A | 3/2024 |
| CN | 114662328 B | 4/2024 |

OTHER PUBLICATIONS

Ma et al., "CARAF: Crypto Agility Risk Assessment Framework," Journal of Cybersecurity; Apr. 30, 2021.

Valence, Arnaud, "ICAR, a categorical framework to connect vulnerability, threat and asset managements," retrieved from https://arxiv.org/pdf/2306.12240v1; Jun. 21, 2023.

* cited by examiner

200

Processor 202

Memory 204

Communications Hardware 206

Graph Circuitry 208

Upgrade Analysis Circuitry 210

520

Select upgrade type...

522

Selected node details:

Node F
Depends on:
Node J, Node D

Dependency for:
Node C

Upgrade tasks:
4772, #5112

500

Node D
508

Node F
512

Node J
518

Node C
506

Node A
502

Node H
516

Node B
504

Node E
510

Node G
514

SYSTEMS AND METHODS FOR ESTIMATING A CRYPTO-AGILITY SCORE OF A NETWORK OF COMPUTING ASSETS

BACKGROUND

Crypto-agility refers to the ability to switch between different cryptographic primitives and may provide a measure of a network's ability to adapt to changing conditions. An organization with networked assets having poor crypto-agility may be unable to adequately respond to discoveries of vulnerabilities in various security applications.

BRIEF SUMMARY

As the landscape of cybersecurity evolves, an important consideration for administrators of computer networks is the ability to respond rapidly to changes such as discoveries of vulnerabilities in cryptographic primitives. In particular, the introduction of post-quantum cryptography (PQC) has led to the adoption of many new cryptographic primitives which must be tested, adopted, and implemented to prepare for the eventuality of security threats involving quantum computing attacks. While the possibility of discovering a new vulnerability in an existing cryptographic primitive is always present, the relatively recent introduction and adoption of new PQC techniques elevates this risk.

The concept of crypto-agility depends not only on a network's ability to change or upgrade deployed cryptographic primitives, but the interdependency of these cryptographic primitives with other applications. Certain applications or versions of applications may be compatible with only certain primitives, making a full assessment of a network's crypto-agility a difficult task. A complete assessment of crypto-agility must consider not only the upgrade costs of critical applications, but also their relationships to and dependencies on other network assets.

Traditional assessments of crypto-agility are typically either based on qualitative assessments or fail to capture the complexity of interconnected network resources. The volume of information associated with understanding each connected network asset is typically overwhelming and difficult to capture. Additionally, crypto-agility assessments are typically difficult to convert into actionable recommendations or items. A network may be assessed to have high or low crypto-agility, but it may be difficult to understand the risk associated with such determinations.

In contrast, example embodiments disclosed herein relate to a knowledge graph construct that incorporates information from existing organizational models and databases, including maps of physical network assets, organizational structures, risk models, and security policy directives. The knowledge graphs in example embodiments incorporate entities and relationships from risk modeling methods, including applications, nodes, geospatial information, cryptographic profiles, and remediation means. Example embodiments further incorporate maps of physical networked computing assets and may incorporate security policy information and organizational structure to form a combined knowledge graph that completes a total picture of network assets, their connectedness, and costs associated with upgrading and/or changing various cryptographic primitives or other applications.

By collecting information into a knowledge graph, example embodiments may further utilize ontology-based inferences over the data. For example, insights may be gained relating to critical dependencies, bottlenecks, or potential expansions to the structure of the network. By gaining a complete understanding of the connectivity of organizational resources, the scale of a proposed upgrade may be more fully understood in order to plan a move to a new security application. The knowledge graph overlay may provide a more detailed cost assessment than models based on traditional databases, better assessing the downtimes and costs to various customers, lines of business, and the like. The knowledge graph layer also provides an intuitive, user-friendly interface to users, which improves the understandability of logical connections between organization assets.

Accordingly, the present disclosure sets forth systems, methods, and apparatuses that estimate a crypto-agility score of a network of computing assets. There are many advantages of these and other embodiments described herein. For instance, by aggregating information about network assets and associated upgrade costs into a knowledge graph, experts may easily browse an intuitive interface that connects related concepts contained in the network, leading to insights that are difficult to achieve in traditional presentations. In addition, developing an understanding of network vulnerabilities based on interconnected network nodes allows administrators to assess hidden costs associated with connections to resources outside the scope of traditional crypto-agility analyses, such as connections to vendors and other organizations.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
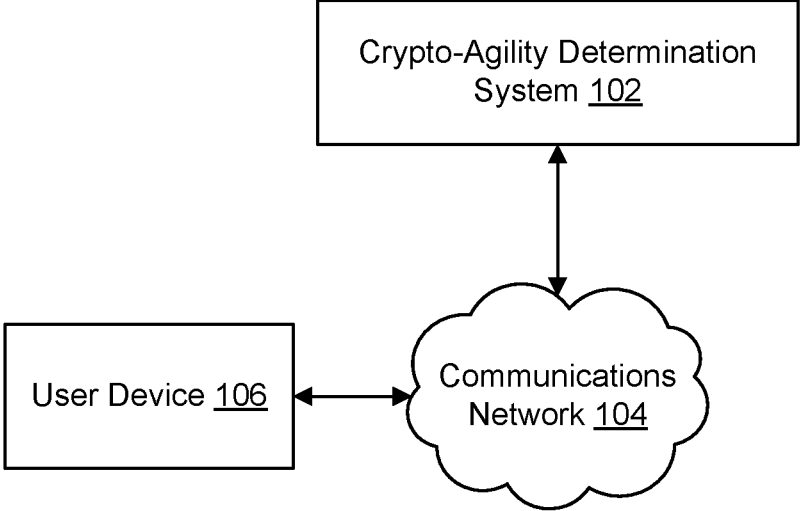
FIG. 1 illustrates a system in which some example embodiments may be used for estimating a crypto-agility score of a network of computing assets.

Example embodiments described herein may be implemented using any of a variety of computing devices or servers. To this end, FIG. 1 illustrates an example environment within which various embodiments may operate. As illustrated, a crypto-agility determination system 102 may receive and/or transmit information via communications network 104 (e.g., the Internet) with any number of other devices, such as user device 106.

The crypto-agility determination system 102 may be implemented as one or more computing devices or servers, which may be composed of a series of components. Particular components of the crypto-agility determination system 102 are described in greater detail below with reference to apparatus 200 in connection with FIG. 2.

The user device 106 may be embodied by any computing devices known in the art. The user device 106 need not be an independent devices, but may be embodied as one or more peripheral devices communicatively coupled to other computing devices.

Example Implementing Apparatuses

Figure 2:
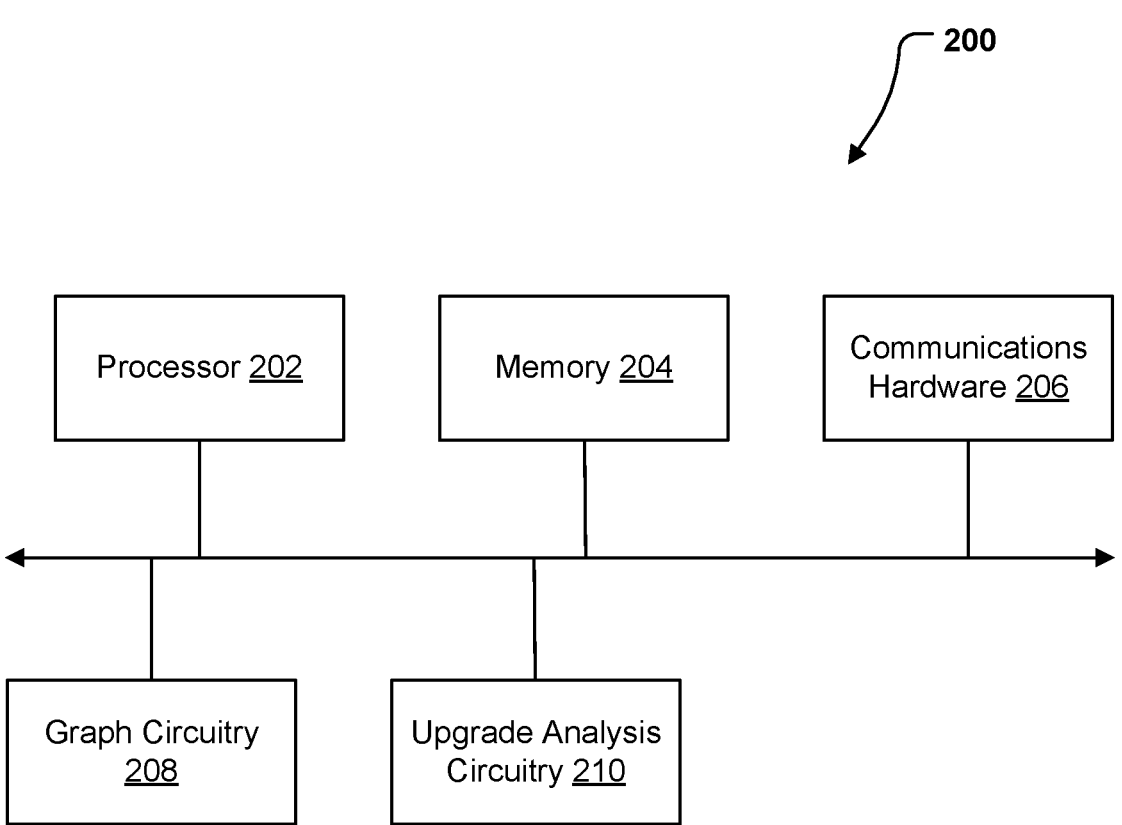
FIG. 2 illustrates a schematic block diagram of example circuitry embodying a crypto-agility determination system that may perform various operations in accordance with some example embodiments described herein.

The crypto-agility determination system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3A, 3B, 3C, and 4. As illustrated in FIG. 2, the apparatus 200 may include processor 202, memory 204, communications hardware 206, graph circuitry 208, and upgrade analysis circuitry 210, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a graph circuitry 208 that selects network nodes and determines total scores from related graph nodes. The graph circuitry 208 may utilize processor 202, memory 204, or any other hardware component included in the apparatus 200 to perform these operations, as described in connection with FIGS. 3A-4 below. The graph circuitry 208 may further utilize communications hardware 206 to gather data from a variety of sources (e.g., user device 106, shown in FIG. 1), and/or exchange data with a user, and in some embodiments may utilize processor 202 and/or memory 204 to manipulate and retrieve information from graphs.

In addition, the apparatus 200 further comprises an upgrade analysis circuitry 210 that computes upgrade costs for graph nodes. The upgrade analysis circuitry 210 may utilize processor 202, memory 204, or any other hardware component included in the apparatus 200 to perform these operations, as described in connection with FIGS. 3A-4 below. The upgrade analysis circuitry 210 may further utilize communications hardware 206 to gather data from a variety of sources (e.g., user device 106, as shown in FIG. 1), and/or exchange data with a user, and in some embodiments may utilize processor 202 and/or memory 204 to determine upgrade costs of graph nodes.

Although components 202-210 are described in part using functional language, it will be understood that the particular implementations necessarily include the use of particular hardware. It should also be understood that certain of these components 202-210 may include similar or common hardware. For example, the graph circuitry 208 and upgrade analysis circuitry 210 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" with respect to elements of the apparatus therefore shall be interpreted as necessarily including the particular hardware configured to perform the functions associated with the particular element being described. Of course, while the terms "circuitry" should be understood broadly to include hardware, in some embodiments, the terms "circuitry" may in addition refer to software instructions that configure the hardware components of the apparatus 200 to perform the various functions described herein.

Although the graph circuitry 208 and upgrade analysis circuitry 210 may leverage processor 202, memory 204, or communications hardware 206 as described above, it will be understood that any of graph circuitry 208 and upgrade analysis circuitry 210 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that graph circuitry 208 and upgrade analysis circuitry 210 comprise particular machinery designed for performing the functions described herein in connection with such elements of apparatus 200.

In some embodiments, various components of the apparatuses 200 may be hosted remotely (e.g., by one or more cloud servers) and thus need not physically reside on the apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of graphical user interfaces and flowcharts.

Example Operations

Turning to FIGS. 3A, 3B, 3C, and 4, example flowcharts are illustrated that contain example operations implemented by example embodiments described herein. The operations illustrated in FIGS. 3A-4 may, for example, be performed by the crypto-agility determination system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, graph circuitry 208, upgrade analysis circuitry 210, and/or any combination thereof. It will be understood that user interaction with the crypto-agility determination system 102 may occur directly via communications hardware 206 or may instead be facilitated by a separate user device 106, as shown in FIG. 1, and which may have similar or equivalent physical componentry facilitating such user interaction.

Figure 3A:
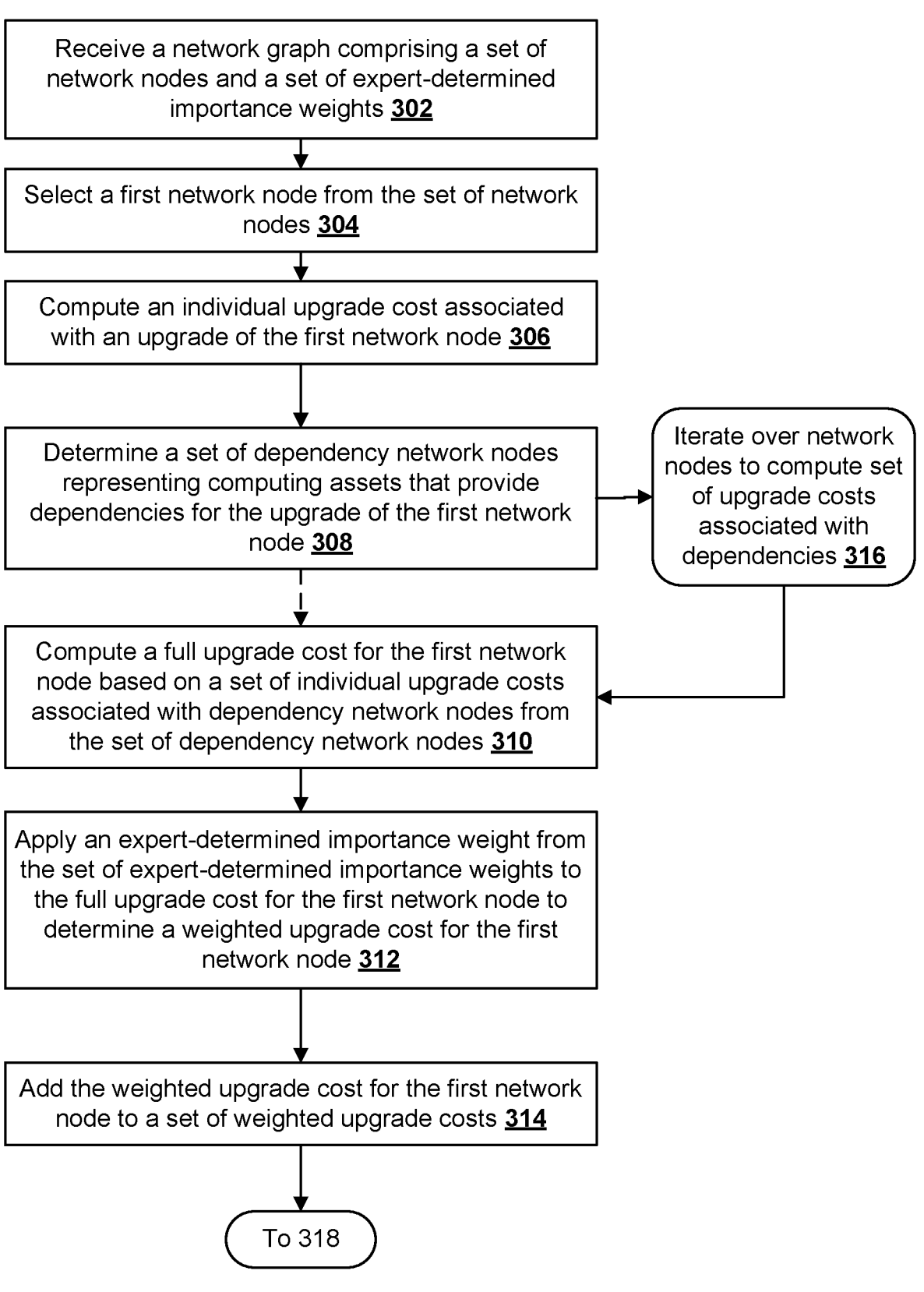
FIG. 3A illustrates an example flowchart for estimating a crypto-agility score of a network of computing assets, in accordance with some example embodiments described herein.

Turning first to FIG. 3A, example operations are shown for estimating a crypto-agility score of a network of computing assets.

As shown by operation 302, the apparatus 200 includes means, such as memory 204, communications hardware 206, or the like, for receiving a network graph comprising a set of network nodes and a set of expert-determined importance weights. The communications hardware 206 may receive the network graph via a network connection (e.g., via communications network 104), for example, via an application programming interface (API), file sharing protocol, web server, file transfer protocol, or any other methods known in the art. In some embodiments, the communications hardware 206 may retrieve the network graph from storage, such as memory 204, or remote storage such as a network attached storage device, file server, or other storage.

The network graph may be a knowledge graph comprising a set of network nodes. In various embodiments, the network nodes may be associated with other network nodes via subject-predicate-object relations. For example, node A and node B may represent physical devices that are directly connected by physical cabling, and may have a relationship "node A physically wired to node B". In another example, node A may be an application and node B may be a network host, which may have a relationship "node A installed on node B". The network graph may be a knowledge graph or other graph structure that includes expert information curated to represent a real-world network infrastructure.

The network graph may include multiple layers of abstraction related to a computing network. For example, nodes may represent physical hardware devices (e.g., routers, servers, switches, printers, mobile devices, Internet of Things (IoT) devices, and the like), applications, and/or data (e.g., databases, encrypted data, binary data, collections of documents, images, and/or the like).

In some embodiments, the network graph may include or may be associated with an ontology which may provide expert input that provides generalized properties to various classes of objects represented in the network graph. The ontology may define entities, relationships, classes of entities, properties, axioms, and/or the like that enable the application of semantic meaning to the various knowledge graph entities and relationship. The addition of an ontology to a network graph to form a knowledge graph may enable the use of reasoning and inference to define rules, draw conclusions, or extract data from the existing relationships of the knowledge graph.

The set of expert-determined importance weights may be a set of numerical values, where each network node has a corresponding importance weight. In some embodiments, a network node may not have a corresponding importance weight, and a default value (e.g., "importance weight=1") may be assigned to network nodes without an explicit importance weight. For example, a user may wish to provide only a small number of importance weights to provide an indication to the graph circuitry 208 that certain nodes should be considered to be important when assessing crypto-agility. In some embodiments, no importance weights may be provided, and default weights will be assigned to each network node.

As shown by operation 304, the apparatus 200 includes means, such as graph circuitry 208, or the like, for selecting a first network node from the set of network nodes. The graph circuitry 208 may select an initial network node based on any of a number of criteria. In some embodiments, the graph circuitry 208 may random select the first network node, or may begin with the network node having the lowest identification number. In various embodiments, a user may select a network node to begin computation, and the initial node may be specified by the user. The first network node may be selected to begin an iterative process that ultimately may include every network node, or at least may include a subset of the network nodes.

As shown by operation 306, the apparatus 200 includes means, such as communications hardware 206, upgrade analysis circuitry 210, or the like, for computing an individual upgrade cost based on an upgrade of the first network node. The upgrade analysis circuitry 210 may compute the individual upgrade cost based on a combination of expert input and quantitative analysis. The upgrade analysis circuitry 210 may, for example, use deep learning, machine learning, or other techniques to determine an upgrade cost based on input features corresponding to expert input and objective characteristics of the network graph (e.g., data from a knowledge graph). The upgrade analysis circuitry 210 may further use a trained model, for example, as described above, training on real-world examples, synthetic data, or the like to train a model based on known characteristics of upgrades (e.g., time required, financial cost, or the like).

In some embodiments, the upgrade analysis circuitry 210 may use a rules-based (e.g., may not use machine learning, deep learning, artificial intelligence, or the like) to determine an individual upgrade cost based on expert input and objective data from the network graph. For example, upgrade analysis circuitry 210 may ingest data regarding upgrades performed in test environments, vendor-provided upgrade information, log files, and/or the like. The upgrade analysis circuitry 210 may use the ingested data to compute an individual upgrade cost based on a formula or algorithm, which may be tuned using expert input, and may thus be developed without the use of large training datasets needed for machine learning and/or artificial intelligence approaches.

The upgrade cost and/or individual upgrade cost (also the weighted upgrade cost, full upgrade cost, perturbed upgrade cost, and the like) may be a numerical value, and may be expressed as a dimensionless quantity or using arbitrary units. In some embodiments, the upgrade cost may be expressed as a number of expert hours, a financial cost, or other dimensioned quantities, or the upgrade cost may be an abstract representation giving the relative organizational effort needed to gain upgrade hardware, software, or firmware of a network asset represented by a network node.

The definition upgrading a network node may vary considerably and depend on the context of the upgrades being studied, the type of network, the type of individual network node, and/or other factors. For example, for a network node representing a software application, an upgrade may refer to installing a new version of the existing software application or removing the software application and installing a new software application that provides the same services (for example, a cryptographic primitive provided by a different vendor). For a network node representing a hardware device, upgrading may involve upgrading to a new hardware device with improved capabilities, compatibility, or other desired features.

Accordingly, in some embodiments, a user may select a particular type of upgrade of interest to study for the network system represented by the network graph. For example, a user may select a set of upgrades related to PQC techniques. In analyzing upgrades related to PQC techniques, network nodes may be associated with upgrades and upgrade costs related to changing cryptographic primitives to and/or from various PQC techniques. In another example, a set of upgrades may be studied related to a particular PQC technique, analyzing the crypto-agility associated with a scenario in which a vulnerability is discovered in a particular PQC technique, to test a sytem's ability to respond to the discovery of vulnerability.

In some embodiments, information about upgrades related to each network node may be stored in a knowledge graph or other database associated with the network graph. For example, several upgrade paths and types of upgrades may be represented in stored data, and users may need only select from among the available types of upgrades to study.

In embodiments in which an ontology is associated with the network graph and/or the network graph is a knowledge graph, computing the upgrade cost may take into account various subject-predicate-object (or semantic triple) relationships. The subject-predicate-object relationships may include the input information that upgrade analysis circuitry 210 may utilize to compute a difficulty score.

It will be understood that, although the computation of a single individual upgrade cost is described here in connection with operation 308, example methods may iterate over each other network node in the network graph to determine a set of individual upgrade costs, or may compute upgrade costs in parallel to obtain an individual upgrade cost for each network node or a subset comprising network nodes of interest.

As shown by operation 308, the apparatus 200 includes means, such as graph circuitry 208, upgrade analysis circuitry 210, or the like, for determining a set of dependency network nodes representing computing assets that provide dependencies for the upgrade of the first network node. The upgrade analysis circuitry 210 may determine a set of possible dependencies for a network node based on stored information about dependencies of a computing asset represented by the first network node. The possible dependencies for the network node may be determined as a list or set of dependencies and may be interpreted by the graph circuitry 208 as a set of corresponding network nodes. The graph circuitry 208 may designate the set of corresponding network nodes as the set of dependency network nodes representing computing assets that provide dependencies for the upgrade of the first network node.

In determining dependencies of the first upgrade node, the upgrade analysis circuitry 210 may base the determination on the type of upgrades that are selected for study, as discussed previously in connection with operation 306. For example, a configuration for studying PQC upgrades may include dependencies for upgrades that relate to upgrading PQC cryptographic primitives. Information about the upgrades and dependencies available for each asset represented by a network node may be stored in a knowledge graph or other database associated with the network graph. For example, a library A may require an operating system kernel of at least version B, which may be encoded by a relation "library A depends on kernel version≥B".

As shown by operation 310, the apparatus 200 includes means, such as graph circuitry 208, upgrade analysis circuitry 210, or the like, for computing a full upgrade cost for the first network node based on a set of individual upgrade costs associated with dependency network nodes from the set of dependency network nodes. An example implementation of operation 310 is described in connection with FIG. 4.

Figure 4:
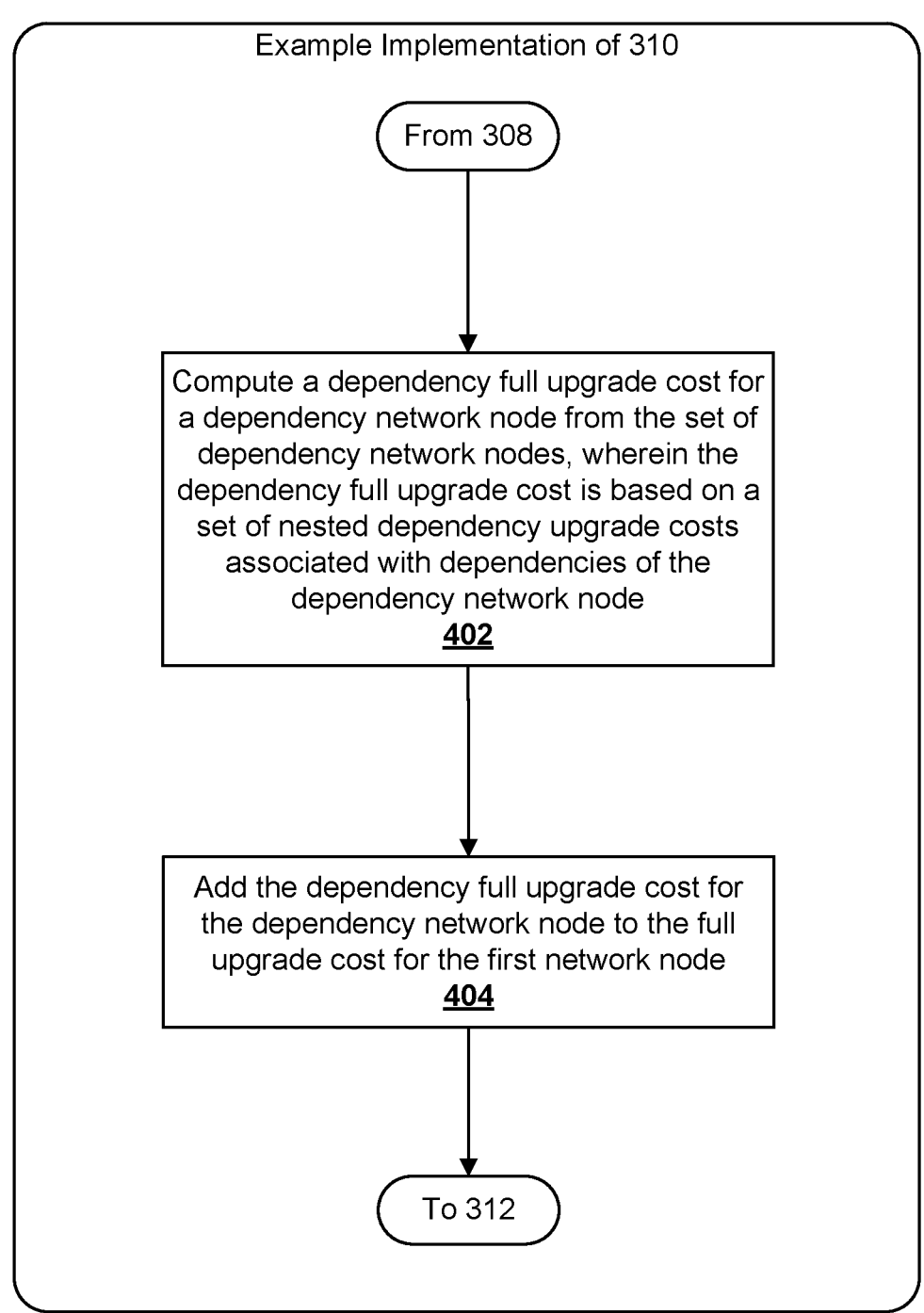
FIG. 4 illustrates an example flowchart for compute an upgrade cost for a network node, in accordance with some example embodiments described herein.

Turning next to FIG. 4, example operations are shown for computing a full upgrade cost. As shown by operation 402, the apparatus 200 includes means, such as graph circuitry 208, or the like, for computing a dependency full upgrade cost for a dependency network node from the set of dependency network nodes. The dependency full upgrade cost may be based on a set of nested dependency upgrade costs associated with dependencies of the dependency network node. The graph circuitry 208 may compute the dependency full upgrade cost by following the procedure described previously in connection with operation 306, operation 308 and operation 310.

In some embodiments, computing the dependency full upgrade cost may include recursively performing the operations of FIG. 4 on dependencies of the dependency network node, resulting in a set of nested dependency upgrade costs associated with dependencies of the dependency network node. The depth of recursion for computing the set of nested dependency upgrade costs may be configurable and may be adjusted to balance the number of computations performed against the level of detail achieved in the full upgrade calculations. For example, a full upgrade cost may be computed for node "A", which depends on node "B". An individual upgrade cost may be computed for node "A" and node "B". The set of dependency network nodes may be determined for node "A" to be the set including node "B". The full upgrade cost of node "A" may be determined based on an individual upgrade cost of upgrading the dependency node "B" and the individual upgrade cost of node "A". In examples with higher levels of recursion, a set of dependency nodes depending on node "B" may be determined in order to compute a dependency full upgrade cost for node "B".

As shown by operation 404, the apparatus 200 includes means, such as graph circuitry 208, or the like, for adding the dependency full upgrade cost for the dependency network node to the full upgrade cost for the network node. The graph circuitry 208 may compute the dependency full upgrade cost for the dependency network node during operation 402 and may add the dependency full upgrade cost to other dependency full upgrade costs for other dependency network nodes from the set of dependency network nodes to obtain the full upgrade cost for the first network node. The dependency full upgrade costs themselves may be computed using the operations described in FIG. 4, leading to a recursive computation of the full upgrade cost for the first network node. If a recursive computation is used, the graph circuitry 208 may first compute the dependency full upgrade cost recursively before adding the dependency full upgrade cost to the full upgrade cost for the first network node.

To continue the example above, a full upgrade cost may be computed for node "A", which depends on node "B". An individual upgrade cost may be computed for node "A" and node "B". The set of dependency network nodes may be determined for node "A" to be the set including node "B". With a level of recursion set to zero, the full upgrade cost of node "A" may be determined by adding the individual upgrade cost of node "B" to the individual upgrade cost of node "A". With a level of recursion set to one, the full upgrade cost of node "A" may be determined by next determining the set of dependencies of node "B" (which may include, for examples, nodes "C" and "D") and determining a full upgrade cost for node "B", then subsequently adding the full upgrade cost of node "B" to the individual upgrade cost of node "A".

Returning now to FIG. 3A, as shown by operation 312, the apparatus 200 includes means, such as memory 204, graph circuitry 208, or the like, for, applying an expert-determined importance weight from the set of expert-determined importance weights to the full upgrade cost for the first network node to determine a weighted upgrade cost for the first network node. The set of expert-determined importance weights may be received, as described previously, during operation 302. In some embodiments, the network nodes may have a relative importance to the overall operation of the computing network, to the particular function that is being studied, a monetary value, and/or the like. The crypto-agility score may be based in part on the relative importance weight of each network node, so that a network configuration in which relatively important network nodes have large upgrade costs leads to determining a less crypto-agile configuration than a network configuration in which relatively unimportant network nodes have equally large upgrade costs.

The relative importance (discussed previously in connection with operation 302) may be applied numerically to the full upgrade cost using a formula. For example, the relative importance may be simply multiplied by the full upgrade cost to obtain the weighted upgrade cost. In some embodiments, more complex formulas or other numerical methods may be used to obtain a weighted upgrade cost. It will be understood that, in some embodiments, the relative importance weights may be set to one, turned off or otherwise disabled, or may not be applied for a subset or all of the network nodes.

As shown by operation 314, the apparatus 200 includes means, such as memory 204, graph circuitry 208, or the like, for adding the weighted upgrade cost for the first network node to a set of weighted upgrade costs. The graph circuitry 208 may, upon determining the weighted upgrade cost, add the weighted upgrade cost to the set of weighted upgrade costs, either by retrieving the set of weighted upgrade costs from memory 204 and inserting the weighted upgrade cost into the set of weighted upgrade costs, or by initializing a new set of weighted upgrade costs (if no set of weighted upgrade costs exists previously). The resulting set of weighted upgrade costs which may contain the weighted upgrade cost may subsequently be stored in memory 204.

As shown by operation 316, the apparatus 200 includes means, such as graph circuitry 208, upgrade analysis circuitry 210, or the like, for iterating over network nodes to compute a set of upgrade costs associated with dependencies. As mentioned previously, the graph circuitry 208, upgrade analysis circuitry 210, and other circuitry of the apparatus 200 may iterate over each network node to compute the set of upgrade costs (e.g., individual upgrade costs, dependency upgrade costs), computing each individual upgrade cost according to the details described in connection with operation 306. For example, a first node may be selected, node "A", and a second node may be selected, node "B." The full upgrade cost may be computed for node "A" based on an individual upgrade cost computed for dependency node "B."

In some embodiments, filters or selections may be placed, and/or heuristics may be used to avoid iterating over the entire set of network nodes. For example, completely disconnected network nodes with no relationship to other network nodes may default to a base value as they have no bearing on the full upgrade costs of other network nodes. In some embodiments, configuration settings may disable the computation of upgrade costs for various classes of network nodes.

Figure 3B:
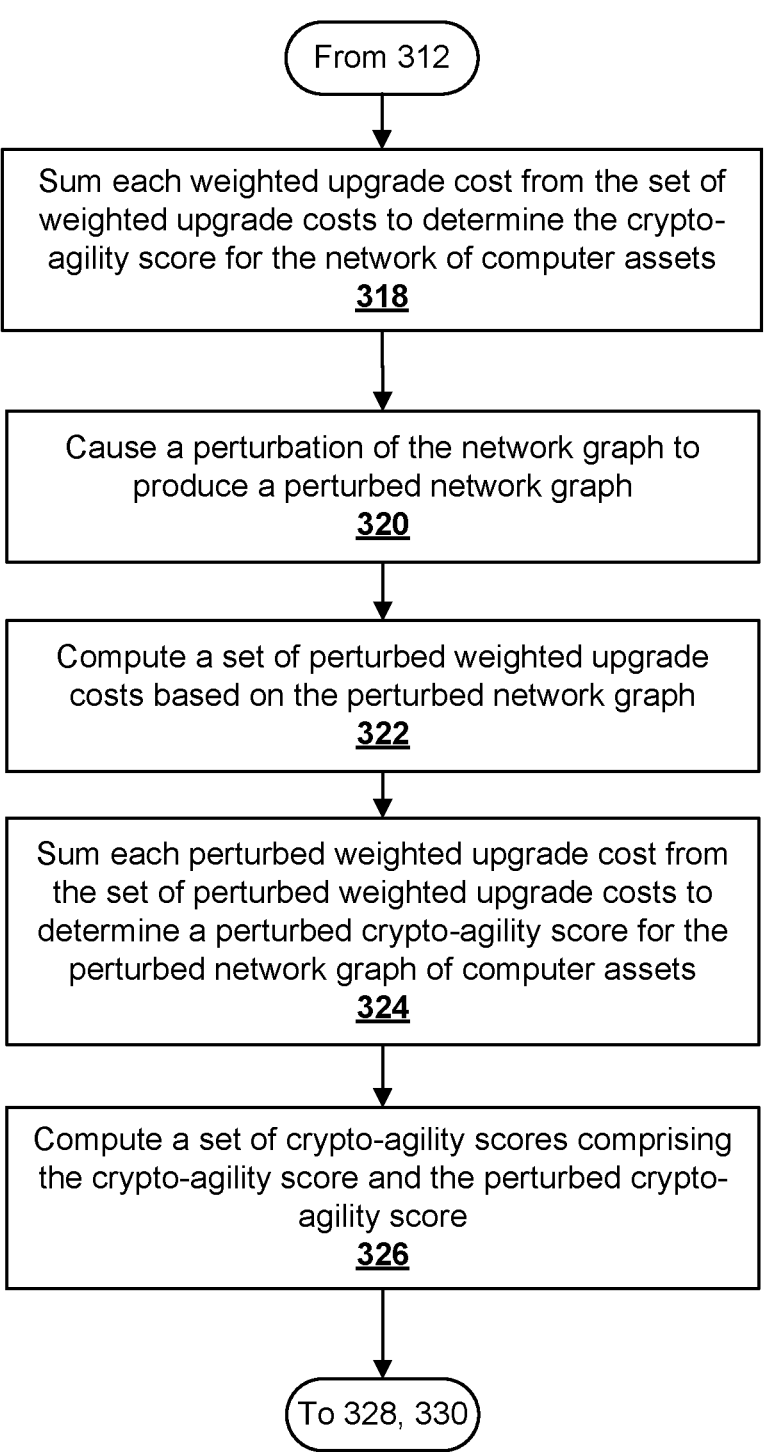
FIG. 3B further illustrates an example flowchart for estimating a crypto-agility score of a network of computing assets, in accordance with some example embodiments described herein.

Turning now to FIG. 3B, as shown by operation 318, the apparatus 200 includes means, such as graph circuitry 208 or the like, for summing each weighted upgrade cost from the set of weighted upgrade costs to determine the crypto-agility score for the network of computer assets. The graph circuitry 208 may determine each weighted upgrade cost from the set of weighted upgrade costs and compute a sum. In some embodiments, additional weights, conditions, or other functions may be included when summing the set of weighted upgrade costs. The sum of weighted upgrade costs may be stored (e.g., in memory 204) as the crypto-agility score for the network of computer assets. In some embodiments, the crypto-agility score may be transmitted or outputted to the user to consider, for example in a log file, printed to a screen, and/or the like.

As shown by operation 320, the apparatus 200 includes means, such as graph circuitry 208 or the like, for causing a perturbation of the network graph to produce a perturbed network graph. The graph circuitry 208 may cause variations in properties of network nodes, add or delete network nodes, add or delete graph edges, change properties of relationships between network nodes (e.g., subject-predicate-object relationships in a knowledge graph) or otherwise modify the network graph to generate a perturbed network graph.

The graph circuitry 208 may cause perturbations at a scope indicated by a pre-determined, configurable perturbation parameter. For example, a large perturbation parameter may result in large perturbations in which the graph circuitry 208 may add, subtract, or change properties of several network graph entities, resulting in a process that explores the space of possible network graphs more quickly. In contrast, a small perturbation parameter may cause only minimal changes to the network graph, which may explore the space of possible network graphs more thoroughly.

The graph circuitry 208 may cause any of a number of different types of perturbations. Examples of types of perturbations include adding a network node (e.g., representing installing a new hardware or software network resource), removing a network node (e.g., representing removing or uninstalling a hardware or software network resource), changing one or more properties of a network node (e.g., using a library from a different vendor, changing a configuration variable of a software installation), adding an edge to the network graph (e.g., adding a computing device to an existing subnetwork), removing an edge from the network graph (e.g., disconnecting a computing device to an existing subnetwork), changing a property of a network edge (e.g., reconfiguring a connection of a computing device to a subnetwork), and/or the like. In embodiments in which a knowledge graph is used, perturbations may be made to the graph structure of the knowledge graph and/or underlying database entries or ontology of the knowledge graph.

In some embodiments, the graph circuitry 208 may impose constraints on the types of perturbations to ensure that only realistic network configurations are generated. For example, perturbations that may render a computing node inoperable may be restricted. Certain properties that are determined by other, higher-level properties may likewise be locked or restricted. For example, a choice of a particular software distribution from a particular vendor may determine a set of lower-level properties for a network node, such as the number of hours needed to perform an upgrade. By causing a perturbation of properties of the network node, a property such as the software vendor may be able to be changed, but a lower-level or dependent property such as the time needed for upgrade may be locked an unable to be directly changed.

As shown by operation 322, the apparatus 200 includes means, such as graph circuitry 208, upgrade analysis circuitry 210, or the like, for computing a set of perturbed weighted upgrade costs based on the perturbed network graph. The graph circuitry 208, upgrade analysis circuitry 210, and/or other components of the apparatus 200 may compute the set of perturbed weighted upgrade costs using methods described in connection with operation 304 through operation 314 above, using perturbed network graphs rather than or in addition to the network graph received in connection with operation 302. The graph circuitry 208, upgrade analysis circuitry 210, and/or other components of the apparatus 200 may perform the computations as described to determine a set of perturbed weighted upgrade costs. In some embodiments, the set of perturbed weighted upgrade costs may relate to the set of upgrade costs with a one-to-one mapping (e.g., each upgrade cost has a corresponding perturbed weighted upgrade cost). In some embodiments, a perturbation may add or delete a network node and/or connection, so there may be upgrade costs in the set of perturbed weighted upgrade costs that do not correspond to an upgrade cost in the set of weighted upgrade costs, or vice versa.

As shown by operation 324, the apparatus 200 includes means, such as graph circuitry 208, upgrade analysis circuitry 210, or the like, for summing each perturbed weighted upgrade cost from the set of perturbed weighted upgrade costs to determine a perturbed crypto-agility score for the perturbed network graph of computer assets. The graph circuitry 208 may determine each perturbed weighted upgrade cost from the set of perturbed weighted upgrade costs and compute a sum. In some embodiments, additional weights, conditions, or other functions may be included when summing the set of perturbed weighted upgrade costs. The sum of perturbed weighted upgrade costs may be stored (e.g., in memory 204) as the perturbed crypto-agility score for the network of computer assets. In some embodiments, the perturbed crypto-agility score may be transmitted or outputted to the user to consider, for example in a log file, printed to a screen, and/or the like.

Figure 3C:
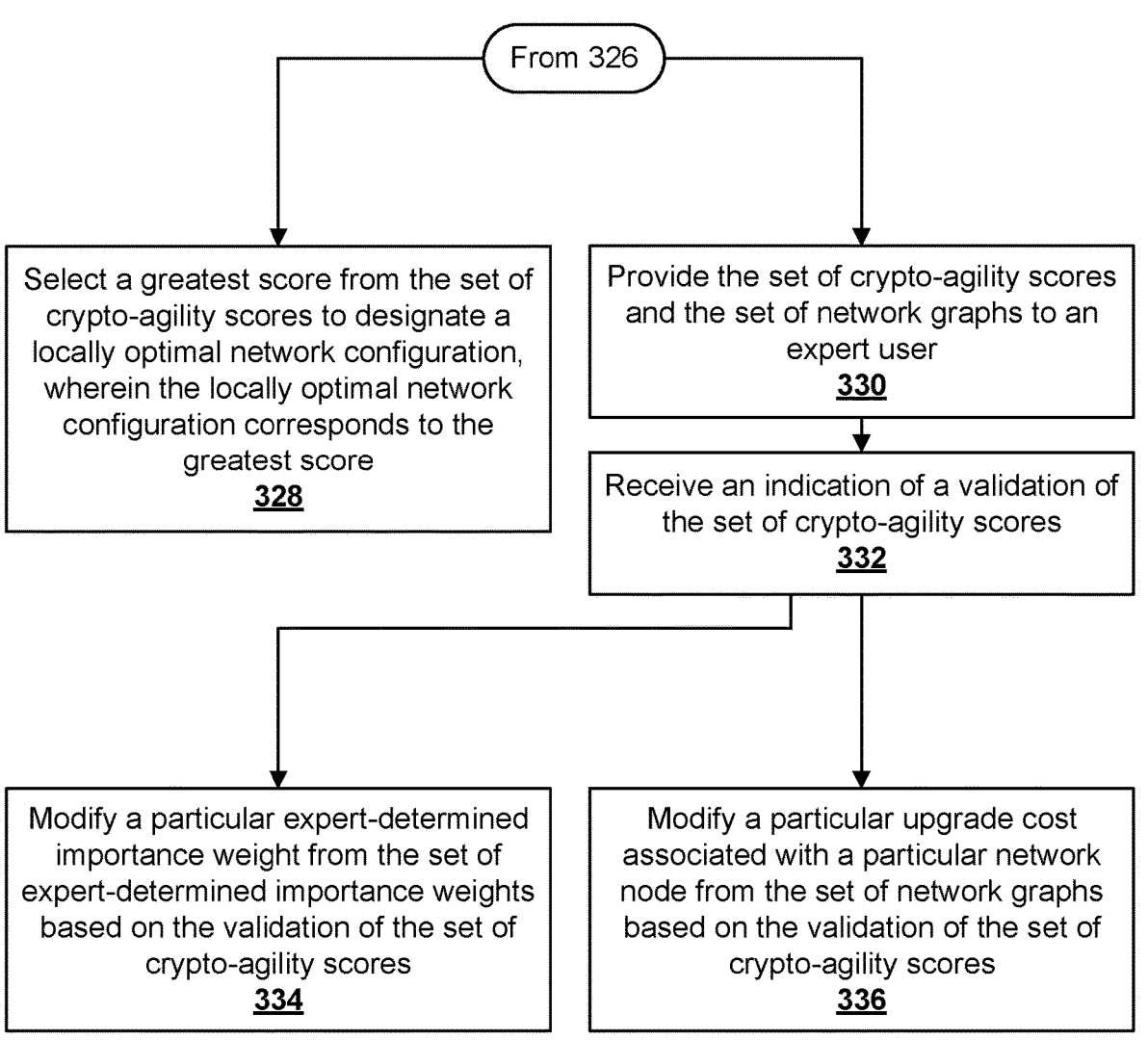
FIG. 3C further illustrates an example flowchart for estimating a crypto-agility score of a network of computing assets, in accordance with some example embodiments described herein.

As shown by operation 326, the apparatus 200 includes means, such as graph circuitry 208, upgrade analysis circuitry 210, or the like, for computing a set of crypto-agility scores comprising the crypto-agility score and the perturbed crypto-agility score. The graph circuitry may add the perturbed crypto-agility score and the crypto-agility score to a set of crypto-agility scores. In some embodiments, operation 320, operation 322, and operation 324 may be repeated to generate a plurality of perturbed network graphs and corresponding perturbed crypto-agility scores, which may be added to the set of crypto-agility scores. As shown by FIG. 3C, control may pass from operation 326 to operation 328 and/or operation 330, depending on the embodiment, configuration, or the like.

Turning now to FIG. 3C, as shown by operation 328, the apparatus 200 includes means, such as graph circuitry 208 or the like, for selecting a greatest score from the set of crypto-agility scores to designate a locally optimal network configuration, wherein the locally optimal network configuration corresponds to the greatest score. The graph circuitry 208 may automatically designate the network configuration that corresponds to the greatest crypto-agility score from the set of crypto-agility scores as an optimized network configuration. The set of crypto-agility scores, as discussed previously in connection with operation 326, may include crypto-agility scores computed from a variety of network configurations that may result from perturbing a network configuration. Accordingly, the set of perturbed network graphs may represent several small variations from the original network graph, and the network graph having the greatest crypto-agility score may represent a network configuration with a locally optimal crypto-agility.

As shown by operation 330, the apparatus 200 includes means, such as communications hardware 206 or the like, for providing the set of crypto-agility scores and the set of network graphs to an expert user. The communications hardware 206 may display the crypto-agility scores as a list, record the crypto-agility scores to a log, transmit the crypto-agility scores to a user device 106, and/or any other method of providing the list of crypto-agility scores to the expert user. The communications hardware 206 may also provide the set of network graphs, and the correspondence between the set of network graphs and the set of crypto-agility scores, to the user using any of the same methods listed previously. Additionally or alternatively, the communications hardware 206 may use a specialized graphical user interface (GUI) to allow the expert user to navigate the set of network graphs, including information provided by knowledge graphs (in embodiments in which the network graphs are knowledge graphs). For example, an expert user may be able to navigate through a graph and inspect properties of a network node, view various relationships to other network nodes, and/or create filtered views to view nodes and connections of interest.

As shown by operation 332, the apparatus 200 includes means, such as communications hardware 206 or the like, for receiving an indication of a validation of the set of crypto-agility scores. The communications hardware 206 may receive an input, which may be received from an expert user, in response to presenting the set of crypto-agility score and the set of network configurations. In some embodiments, the communications hardware may receive an input that may provide a response of "validated" or "not validated" for each of the network configurations from the set of network configurations. In some embodiments, further details may be received, such as reasons for a network configuration to fail validation.

In some embodiments, the indication of validation may indicate whether a network graph corresponds to a functional and/or realistic configuration of networked computing assets. In some instances, random perturbations to an existing network graph may result in non-physical or unrealistic network configurations, so expert validation may steer the perturbation procedure away from such configurations.

In some embodiments, the expert validation may provide an indication of whether the crypto-agility score determined accurately corresponds to the network graph. In some instances, metadata, expert-determined importance weights, or other factors may skew the determination of crypto-agility and cause unrealistic assessments of crypto-agility that were not able to be foreseen by the expert user, and the expert validation may confirm such cases should they exist.

In some embodiments, the response indicating validation or lack of validation may be used to label a dataset for machine learning and/or artificial intelligence applications using the network graphs reviewed by the expert user.

As shown by operation 334, the apparatus 200 includes means, such as graph circuitry 208 or the like, for modifying a particular expert-determined importance weight from the set of expert-determined importance weights based on the validation of the set of crypto-agility scores. In some embodiments, the graph circuitry 208 may determine that a network graph with expert-determined importance weights may fail expert validation, and may cause adjustments to the expert-determined importance weights accordingly. In some embodiments, the modification may be performed randomly, by perturbing an expert-determined importance weight. In some embodiments, the expert user may provide an additional level of detail in feedback for the validation of the network graph, for example indicating the determined crypto-agility score is too large or too small, and the graph circuitry 208 may adjust importance weights accordingly to make the correction indicated by the expert validation response. The graph circuitry 208 may adjust the importance weights by modifying one or more importance weights and subsequently checking the resulting value of the crypto-agility score.

As shown by operation 336, the apparatus 200 includes means, such as graph circuitry 208 or the like, for modifying a particular upgrade cost associated with a particular network node from the set of network graphs based on the validation of the set of crypto-agility scores. In some embodiments, the graph circuitry 208 may determine that a network graph with may fail expert validation, and may cause adjustments to the upgrade costs accordingly. In some embodiments, the modification may be performed randomly, by perturbing a particular upgrade cost. In some embodiments, the expert user may provide an additional level of detail in feedback for the validation of the network graph, for example indicating the determined crypto-agility score is too large or too small, and the graph circuitry 208 may adjust upgrade costs accordingly to make the correction indicated by the expert validation response. The graph circuitry 208 may adjust the upgrade costs by modifying one or more upgrade costs and/or parameters of the network graph that may impact the upgrade costs, and subsequently checking the resulting value of the crypto-agility score.

FIGS. 3A, 3B, 3C, and 4 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Figure 5:
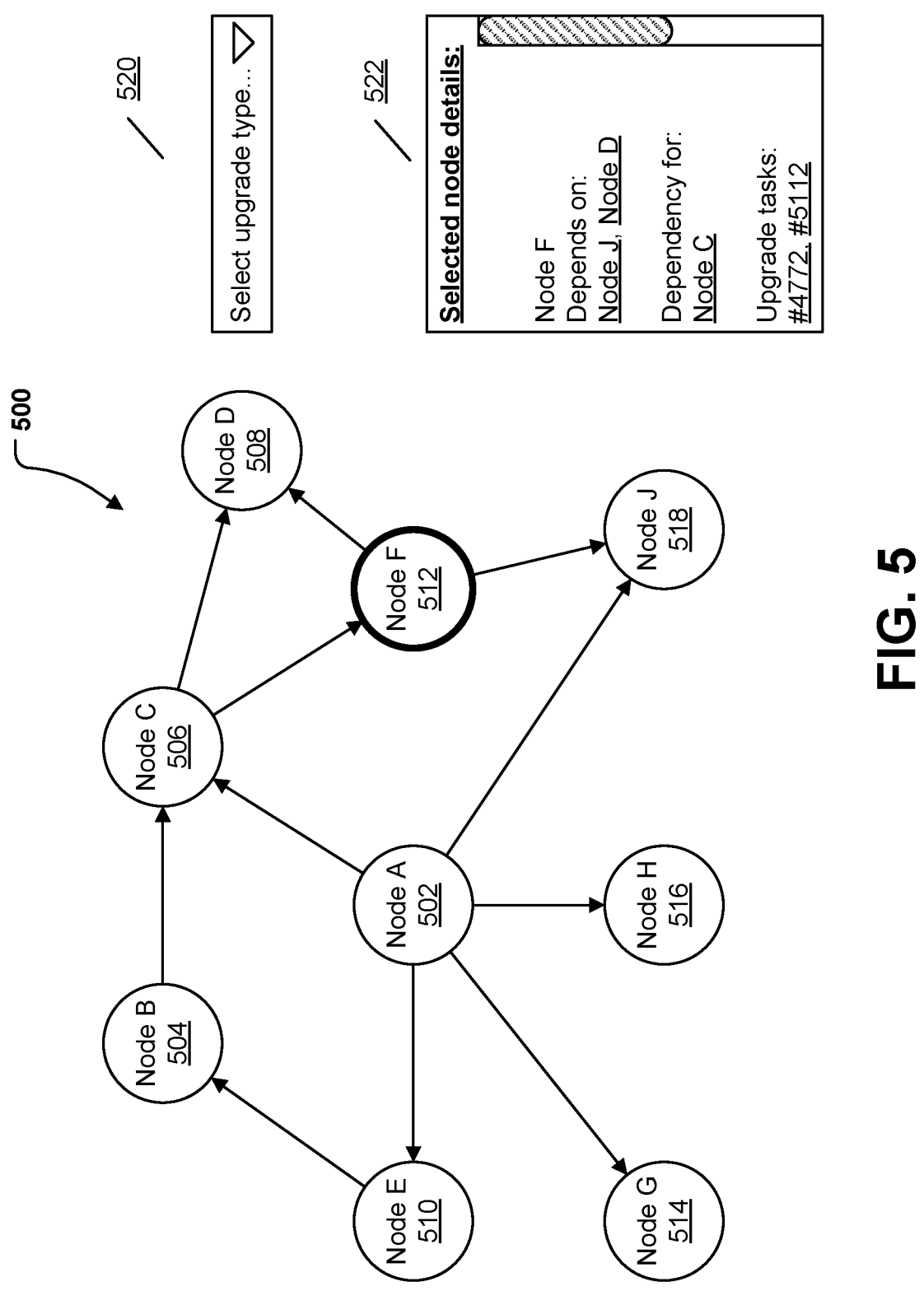
FIG. 5 illustrates another example user-facing visual presentation of the crypto-agility determination used in some example embodiments described herein.

Turning to FIG. 5, a graphical user interface (GUI) is provided that illustrates a network graph 500 with network nodes and dependencies for an example upgrade. As noted previously, a user may interact with the crypto-agility determination system 102 by directly engaging with communications hardware 206 of an apparatus 200 comprising the crypto-agility determination system 102. In such an embodiment, the GUI shown in FIG. 5 may be displayed to a user by the apparatus 200. The GUI shown is an example method of displaying the information to the user, and the user may interact with the GUI by, for example, selecting different nodes, rearranging nodes, modifying elements of the network graph and re-computing upgrade costs, for example.

The network graph 500 shown includes several nodes, including node A 502, node B 504, node C 506, node D 508, node E 510, node F 512, node G 514, node H 516, and node J 518. Arrows between nodes may indicate dependencies to upgrade a node that are provided by the pointed-to node. For example, a selected upgrade to node A 502 may require an upgrade of node C 506, node E 510, node G 514, node H 516, and node J 518. Note that in a full evaluation of upgrade costs, additional or alternate dependencies may be considered that are not pictured in a simplified view, and views shown in GUI for network graph 500 may be subject to a view filter or other techniques to provide visual clarity. As shown, the menu selection 520 allows a user to select an upgrade of interest, and the arrangement and relationships between nodes may change when a different upgrade type is selected.

Details for a node may be viewed by highlighting nodes, and details may be displayed in detail list 522. For example, the details shown may include dependencies on other nodes, dependencies provided for other nodes, a breakdown of the upgrade cost into tasks or other factors that influence the upgrade cost, and/or other information of the like.

CONCLUSION

As described above, example embodiments provide methods and apparatuses that enable improved assessment of crypto-agility. By taking into account the complex relationships and cumulative effects of connected nodes, example embodiments provide a more complete picture of upgrade costs and resulting crypto-agility of systems. Moreover, embodiments described herein provide quantitative results by producing numerical scores while still taking into account expert input, avoiding the limitations of a purely qualitative expert determination of vulnerability that may not account for complex graph relationships.

As these examples all illustrate, example embodiments contemplated herein provide technical solutions that solve real-world problems faced in the field of network security. While network security and risk analysis have been active fields for decades, quantitative solutions that use the full power of knowledge graphs have been previously unavailable. The recently arising ubiquity of knowledge graphs and recent advances in techniques for their analysis have unlocked new avenues to solving this problem that historically were not available, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for estimating a crypto-agility score of a network of computing assets, the method comprising:
   receiving, by communications hardware, a network graph comprising a set of network nodes and a set of weights corresponding to the set of network nodes;
   selecting, by graph circuitry, a first network node from the set of network nodes;

computing, by upgrade analysis circuitry, an upgrade cost for the first network node based on a set of dependency network nodes comprising dependencies of the first network node;

applying, by the graph circuitry, a weight from the set of weights to the upgrade cost for the first network node to determine a weighted upgrade cost for the first network node;

adding, by the graph circuitry, the weighted upgrade cost for the first network node to a set of weighted upgrade costs;

summing, by the graph circuitry, each weighted upgrade cost from the set of weighted upgrade costs to determine the crypto-agility score for the network of computer assets; and providing, by the communications hardware, the crypto-agility score to an expert user.

2. The method of claim 1, further comprising:

computing, by the upgrade analysis circuitry, an individual upgrade cost associated with an upgrade of the first network node;

determining, by the upgrade analysis circuitry, the set of dependency network nodes representing computing assets that provide dependencies for the upgrade of the first network node;

generating a set of individual upgrade costs associated with the set of dependency network nodes; and computing, by the upgrade analysis circuitry, a full upgrade cost for the first network node based on a set of upgrade costs associated with dependency network nodes from the set of dependency network nodes, wherein the upgrade cost is further based on the full upgrade cost.

3. The method of claim 2, wherein computing the full upgrade cost for the first network node comprises:

computing, by the upgrade analysis circuitry, a dependency full upgrade cost for a dependency network node from the set of dependency network nodes, wherein the dependency full upgrade cost is based on a set of nested dependency upgrade costs associated with dependencies of the dependency network node; and adding, by the graph circuitry, the dependency full upgrade cost for the dependency network node to the full upgrade cost for the first network node.

4. The method of claim 2, wherein generating the set of individual upgrade costs associated with the dependency network nodes comprises:

selecting, by the graph circuitry, a next network node, wherein the next network node has not previously been selected, wherein the next network node provides a dependency for the upgrade of the first network node;

computing, by the upgrade analysis circuitry, a next individual upgrade cost associated with the next network node; and adding, by the graph circuitry, the next individual upgrade cost to the set of upgrade costs associated with the dependency network nodes.

5. The method of claim 1, further comprising computing the set of weighted upgrade costs by:

selecting, by the graph circuitry, a next network node, wherein the next network node has not previously been selected;

computing, by the upgrade analysis circuitry, a next upgrade cost for the next network node based on a set of next dependency network nodes comprising dependencies of the next network node;

applying, by the graph circuitry, a next weight from the set of weights to the next upgrade cost for the next network node to determine a next weighted upgrade cost for the next network node; and adding, by the graph circuitry, the next weighted upgrade cost for the next network node to the set of weighted upgrade costs.

6. The method of claim 1, further comprising:

causing, by the graph circuitry, a perturbation of the network graph to produce a perturbed network graph;

computing a set of perturbed weighted upgrade costs based on the perturbed network graph; and summing, by the graph circuitry, each perturbed weighted upgrade cost from the set of perturbed weighted upgrade costs to determine a perturbed crypto-agility score for the perturbed network graph of computer assets.

7. The method of claim 6, further comprising:

computing a set of crypto-agility scores comprising the crypto-agility score and the perturbed crypto-agility score; and selecting a greatest score from the set of crypto-agility scores to designate a locally optimal network configuration, wherein the locally optimal network configuration corresponds to the greatest score.

8. The method of claim 6, further comprising:

computing a set of crypto-agility scores comprising the crypto-agility score and the perturbed crypto-agility score, wherein each particular crypto-agility score from the set of crypto-agility scores is associated with a particular network graph from a set of network graphs;

providing, by the communications hardware, the set of crypto-agility scores and the set of network graphs to the expert user; and receiving, by the communications hardware, an indication of a validation of the set of crypto-agility scores.

9. The method of claim 8, further comprising:

modifying, by the graph circuitry, a selected weight from the set of weights based on the validation of the set of crypto-agility scores.

10. The method of claim 8, further comprising:

modifying, by the graph circuitry, a selected upgrade cost associated with a particular network node from the set of network graphs based on the validation of the set of crypto-agility scores.

11. The method of claim 1, wherein the network graph is a knowledge graph.

12. The method of claim 11, wherein computing the upgrade cost is based on one or more subject-predicate-object relationships between the first network node and a dependency network node from the set of dependency network nodes.

13. An apparatus for estimating a crypto-agility score of a network of computing assets, the apparatus comprising:

communications hardware configured to:

receiving a network graph comprising a set of network nodes and a set of weights corresponding to the set of network nodes;

graph circuitry configured to:

select a first network node from the set of network nodes; and upgrade analysis circuitry configured to:

compute an upgrade cost for the first network node based on a set of dependency network nodes comprising dependencies of the first network node, wherein the graph circuitry is further configured to:

apply a weight from the set of weights to the upgrade cost for the first network node to determine a weighted upgrade cost for the first network node;

add the weighted upgrade cost for the first network node to a set of weighted upgrade costs; and sum each weighted upgrade cost from the set of weighted upgrade costs to determine the crypto-agility score for the network of computer assets;

wherein the communications hardware is further configured to provide the crypto-agility score to an expert user.

14. The apparatus of claim 13, wherein the upgrade analysis circuitry is further configured to:

compute an individual upgrade cost associated with an upgrade of the first network node;

determine the set of dependency network nodes representing computing assets that provide dependencies for the upgrade of the first network node;

generate a set of individual upgrade costs associated with the set of dependency network nodes; and compute a full upgrade cost for the first network node based on a set of upgrade costs associated with dependency network nodes from the set of dependency network nodes, wherein the upgrade cost is further based on the full upgrade cost.

15. The apparatus of claim 14, wherein the upgrade analysis circuitry is further configured to compute the full upgrade cost for the first network node by:

computing a dependency full upgrade cost for a dependency network node from the set of dependency network nodes, wherein the dependency full upgrade cost is based on a set of nested dependency upgrade costs associated with dependencies of the dependency network node; and adding the dependency full upgrade cost for the dependency network node to the full upgrade cost for the first network node.

16. The apparatus of claim 14, wherein the graph circuitry is further configured to generate the set of individual upgrade costs associated with the dependency network nodes by:

selecting a next network node, wherein the next network node has not previously been selected, wherein the next network node provides a dependency for the upgrade of the first network node;

computing a next individual upgrade cost associated with the next network node; and adding the next individual upgrade cost to the set of upgrade costs associated with the dependency network nodes.

17. The apparatus of claim 13, wherein the graph circuitry is further configured to compute the set of weighted upgrade costs by:

selecting a next network node, wherein the next network node has not previously been selected;

computing a next upgrade cost for the next network node based on a set of next dependency network nodes comprising dependencies of the next network node;

applying a next weight from the set of weights to the next upgrade cost for the next network node to determine a next weighted upgrade cost for the next network node; and adding the next weighted upgrade cost for the next network node to the set of weighted upgrade costs.

18. The apparatus of claim 13, wherein the graph circuitry is further configured to:

cause a perturbation of the network graph to produce a perturbed network graph;

computing a set of perturbed weighted upgrade costs based on the perturbed network graph; and sum each perturbed weighted upgrade cost from the set of perturbed weighted upgrade costs to determine a perturbed crypto-agility score for the perturbed network graph of computer assets.

19. The apparatus of claim 18, wherein the graph circuitry is further configured to:

compute a set of crypto-agility scores comprising the crypto-agility score and the perturbed crypto-agility score; and select a greatest score from the set of crypto-agility scores to designate a locally optimal network configuration, wherein the locally optimal network configuration corresponds to the greatest score.

20. A computer program product for estimating a crypto-agility score of a network of computing assets, the computer program product comprising at least one non-transitory computer-readable storage medium storing software instructions that, when executed, cause an apparatus to:

receive a network graph comprising a set of network nodes and a set of weights corresponding to the set of network nodes;

select a first network node from the set of network nodes;

compute an upgrade cost for the first network node based on a set of dependency network nodes comprising dependencies of the first network node;

apply a weight from the set of weights to the upgrade cost for the first network node to determine a weighted upgrade cost for the first network node;

add the weighted upgrade cost for the first network node to a set of weighted upgrade costs;

sum each weighted upgrade cost from the set of weighted upgrade costs to determine the crypto-agility score for the network of computer assets; and provide the crypto-agility score to an expert user.

* * * * *